(12) United States Patent
Manki (10) Patent No.: US 7,379,585 B2
(45) Date of Patent: May 27, 2008

(54) IMAGE PROCESSING FOR TRAPPING IN COLOR PRINTING

(75) Inventor: Toshio Manki, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 620 days.

(21) Appl. No.: 10/986,313

(22) Filed: Nov. 12, 2004

(65) Prior Publication Data
US 2005/0105113 A1    May 19, 2005

(30) Foreign Application Priority Data
Nov. 14, 2003    (JP)    ............ P2003-384831

(51) Int. Cl.
G06K 9/00    (2006.01)
G06K 9/48    (2006.01)

(52) U.S. Cl. ...................... 382/162; 392/199

(58) Field of Classification Search ............. 382/162, 382/166–167, 199, 203, 204; 358/1.9
See application file for complete search history.

(56) References Cited

U.S. PATENT DOCUMENTS 6,141,462 A    10/2000    Yoshino et al.
6,515,763 B1 *    2/2003    Dermer et al. ............... 358/1.9
6,577,777 B1    6/2003    Yoshino et al.
6,795,214 B2 *    9/2004    Weinholz et al. ............ 358/1.9

FOREIGN PATENT DOCUMENTS

JP    09-106460    4/1997

* cited by examiner

*Primary Examiner*—Duy M Dang
(74) *Attorney, Agent, or Firm*—McDermott Will & Emery LLP (57) ABSTRACT

The trapping process described below reliably creates trapping images where needed even when there are small gaps between two adjacent image objects that are parts in the printed output. When a focus object and a related object that is below and adjoins the focus object touch at two points A, B so that a gap region Rg is formed between the focus object and related object, the adjoining vectors identifying where a trapping image must be created are extracted as follows. First, the vector of intersection that is equivalent to the path from point A to point B along the part of the contour of the focus object touching the gap region is determined. Next, the distance L from the midpoint C of this vector of intersection to the related object is calculated, and whether this distance L is less than or equal to specified value e (representing a gap equivalent to one or two pixels) is determined. If distance L is less than or equal to specified value e, that vector of intersection is saved as an adjoining vector.

12 Claims, 5 Drawing Sheets

IMAGE PROCESSING FOR TRAPPING IN COLOR PRINTING

BACKGROUND OF THE INVENTION

1. Field of the Invention

The present invention relates to an image processing apparatus and image processing method for generating image data in the prepress process, and relates more specifically to the process of extracting adjoining vectors identifying locations where trapping images should be generated to prevent exposing the underlying part at color boundaries in color printing.

2. Description of Related Art

A computer called a front-end processor is used in prepress processes to produce, edit, and layout the text, logos, images, pictures, illustrations, and other numerous data parts composing the printed product, and thus output edited layout data ("page description data" below) representing the printed output in a page description language. The edited layout data, i.e., the page description data, is then rasterized by a raster image processor (RIP) to produce bitmapped image data representing the image to be printed. Printing plates are then produced by a plate making machine using this bitmapped image data, or a digital printer prints the bitmapped image data directly to hard copy output.

Before the RIP rasterizes the page description data outputted by the front-end processor, registration marks are added and a trapping process is applied to the page description data. Processes performed before processing by the RIP are referred to herein as RIP preprocesses.

This trapping process spreads the lighter (paler) of two overlapping colors in order to prevent exposing the base (the part knocked out) at the color border due to misregistration during color printing. A prerequisite of this trapping process is detecting where trapping is required using a method such as taught in U.S. Pat. No. 6,577,777, which is incorporated herein by reference and corresponds to Japanese Non-examined Patent Publication H09-106460.

To detect where trapping is required, adjoining vectors such as described below are extracted in RIP preprocessing. Specifically, when two objects, which are parts (shapes) of the overall image in the printout represented by the page description data, are overlapping, the vectors indicating the border between the two objects are extracted as adjoining vectors. More specifically, the objects constituting a page are in an upper-lower relationship based on the order in which they are formed on the page. When two objects overlap, and the part of the contour of the upper object that is equivalent to the path between the intersections of the contours of the two objects is contained in the area of the lower object, that part is extracted as an adjoining vector. An overprinting outline (stroke) with a specified trapping width is then generated along this adjoining vector as the trapping image.

Figure 7:
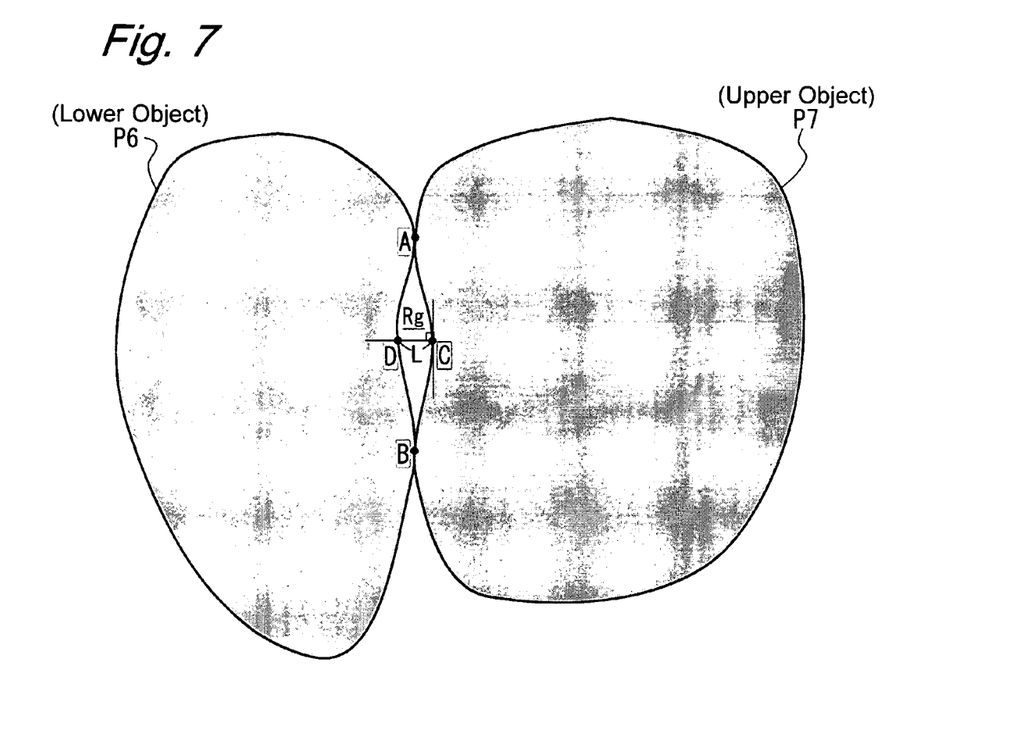
FIG. 7 is a diagram for illustrating a specific example of the adjoining vector extraction process shown in FIG. 5.

There are also cases in which a slight gap is present because there is little overlap between two very close objects. Trapping is also required in such cases. Depending on how the adjoining vectors are extracted, however, adjoining vectors cannot be extracted for this gap, and trapping cannot be applied where needed. When two curves in the contours of two objects P6 and P7 are tangent at two points as shown in FIG. 7, for example, adjoining vectors are not extracted between these two points, and the gap region Rg shown in FIG. 7 cannot be trapped.

SUMMARY OF THE INVENTION

An object of the present invention is therefore to provide an image processing apparatus and image processing method for preprocessing to extract adjoining vectors so that areas requiring trapping can be reliably trapped even when small gaps are present due, for example, to minimal overlap between two objects.

A first aspect of the present invention provides a prepress image processing apparatus for extracting as an adjoining vector a specific portion of a contour of one of two adjoining objects that are parts of an overall image in printed output in order to identify areas for which a trapping image must be generated at color boundaries in color printing to prevent exposing an underlying part. This image processing apparatus includes a point-of-intersection calculation means for calculating points of intersection between the contours of the two objects; a vector-of-intersection calculation means for calculating as a vector of intersection a portion of a contour of an upper object that is equivalent to a path along said contour joining two points of intersection calculated by the point-of-intersection calculation means, the upper object being one of the two objects and being created sequentially after the other one of the two objects; an adjoining vector registration means for registering the vector of intersection as an adjoining vector when the vector of intersection is contained in an area of a lower object, the lower object being the other one of the two objects and being created sequentially before the upper object; and an evaluation means for determining whether to generate a trapping image along the vector of intersection based on a degree of proximity between the vector of intersection and the lower object when the vector of intersection is not contained in the area of the lower object. The adjoining vector registration means registers the vector of intersection as an adjoining vector if the evaluation means determines that a trapping image must be generated along the vector of intersection even though the vector of intersection is not contained in the area of the lower object.

According to such a configuration as the above, if the vector of intersection connecting two points of intersection between two objects is not contained in the area of the lower object, whether to generate a trapping image along that vector of intersection is determined based on the proximity of the vector of intersection to the lower object. If the vector of intersection is close enough to the lower object that generating a trapping image along that vector of intersection is determined necessary, the vector of intersection is stored as an adjoining vector. By thus determining the adjoining vectors, the trapping process can be reliably applied where necessary even if there is a small gap between the two objects due, for example, to little overlap therebetween.

Preferably, when the vector of intersection is not in the area of the lower object, the evaluation means in this prepress image processing apparatus determines that a trapping image must be generated along the vector of intersection if a distance between the midpoint of the vector of intersection and the lower object is less than or equal to a predetermined value.

With this configuration, when the vector of intersection connecting two points of intersection between the two objects is not contained in the area of the lower object, but the distance between the midpoint of that vector of intersection and the lower object is less than or equal to a predetermined value, that vector of intersection is stored as an adjoining vector. As a result, the trapping process can be reliably applied where necessary even if there is a small gap between the two objects due, for example, to little overlap therebetween.

Further preferably, the evaluation means in this prepress image processing apparatus includes means of acquiring the point of intersection between the contour of the lower object and a line that passes through the midpoint of the vector of intersection perpendicularly to a tangent to the upper object at said midpoint, and calculating the length of the line segment connecting said point of intersection and said midpoint as said distance, when the vector of intersection is not in the area of the lower object.

Alternatively in this prepress image processing apparatus, when the vector of intersection is not in the area of the lower object, the evaluation means determines that a trapping image must be generated along the vector of intersection if an area of a gap region formed between the two objects and in contact with the vector of intersection is less than or equal to a predetermined value.

With this configuration, when the vector of intersection connecting two points of intersection between two objects is not located in the area of the lower object, but the area of a gap region formed between the two objects and touching this vector of intersection is less than or equal to a predetermined value, the vector of intersection is stored as an adjoining vector. As a result, the trapping process can be reliably applied where necessary even if there is a small gap between the two objects due, for example, to little overlap therebetween.

A second aspect of the present invention provides a prepress image processing method for extracting as an adjoining vector a specific portion of a contour of one of two adjoining objects that are parts of an overall image in printed output in order to identify areas for which a trapping image must be generated at color boundaries in color printing to prevent exposing an underlying part. This image processing method includes a point-of-intersection calculation step of calculating points of intersection between the contours of the two objects; a vector-of-intersection calculation step of calculating as a vector of intersection a portion of a contour of an upper object that is equivalent to a path along said contour joining two points of intersection calculated in the point-of-intersection calculation step, the upper object being one of the two objects and being created sequentially after the other one of the two objects; an adjoining vector registration step of registering the vector of intersection as an adjoining vector when the vector of intersection is contained in an area of a lower object, the lower object being the other one of the two objects and being created sequentially before the upper object; and an evaluation step of determining whether to generate a trapping image along the vector of intersection based on a degree of proximity between the vector of intersection and the lower object when the vector of intersection is not contained in the area of the lower object. The vector of intersection is registered as an adjoining vector in the adjoining vector registration step if it is determined in the evaluation step that a trapping image must be generated along the vector of intersection even though the vector of intersection is not contained in the area of the lower object.

A third aspect of the present invention provides a prepress image processing program for extracting as an adjoining vector a specific portion of a contour of one of two adjoining objects that are parts of an overall image in printed output in order to identify areas for which a trapping image must be generated at color boundaries in color printing to prevent exposing an underlying part, said program causing a computer to execute a point-of-intersection calculation step of calculating points of intersection between the contours of the two objects; a vector-of-intersection calculation step of calculating as a vector of intersection a portion of a contour of an upper object that is equivalent to a path along said contour joining two points of intersection calculated in the point-of-intersection calculation step, the upper object being one of the two objects and being created sequentially after the other one of the two objects; an adjoining vector registration step of registering the vector of intersection as an adjoining vector when the vector of intersection is contained in an area of a lower object, the lower object being the other one of the two objects and being created sequentially before the upper object; and an evaluation step of determining whether to generate a trapping image along the vector of intersection based on a degree of proximity between the vector of intersection and the lower object when the vector of intersection is not contained in the area of the lower object. The vector of intersection is registered as an adjoining vector in the adjoining vector registration step if it is determined in the evaluation step that a trapping image must be generated along the vector of intersection even though the vector of intersection is not contained in the area of the lower object.

These and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the present invention will be described below with reference to the accompanying figures.

1. Prepress Printing Process

Figure 1:
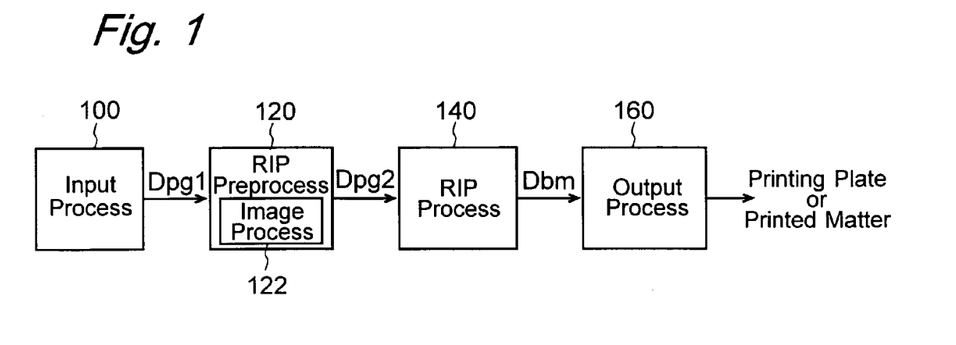
FIG. 1 is a process flow chart schematically showing the overall prepress printing process in which an image processing apparatus according to an embodiment of the present invention is used.

FIG. 1 is a process flow chart of the overall prepress printing process in which a prepress image processing apparatus according to an embodiment of the invention is used. The first step in this prepress printing process is an input process 100 run by a front-end computer to produce the input data. Using the front-end computer, the user edits and arranges the multiple parts in the final printout, including text, logos, pictures, and illustrations, thus creating page description data Dpg1 as the image data describing the printout in a page description language such as PostScript (a registered trademark of Adobe Systems) or PDF (Portable Document Format). This page description data Dpg1 is then converted to bitmapped image data Dbm by a rasterizing process (RIP process) 140. RIP preprocess 120 is run before the RIP process 140, however.

The RIP preprocess 120 applies image process 122 to the page description data Dpg1 for trapping and to add registration marks, for example, resulting in page description data Dpg2. The RIP process 140 is then applied to the preprocessed page description data Dpg2, resulting in bitmapped image data Dbm. An output process 160 is then applied to this bitmapped image data Dbm. More specifically, the bitmapped image data Dbm is sent to a plate recorder or digital printer, and plates recording the image represented by the bitmapped image data Dbm, or the printed matter itself, is produced by the plate recorder or digital printer.

2. Prepress Image Processing Apparatus

Figure 2:
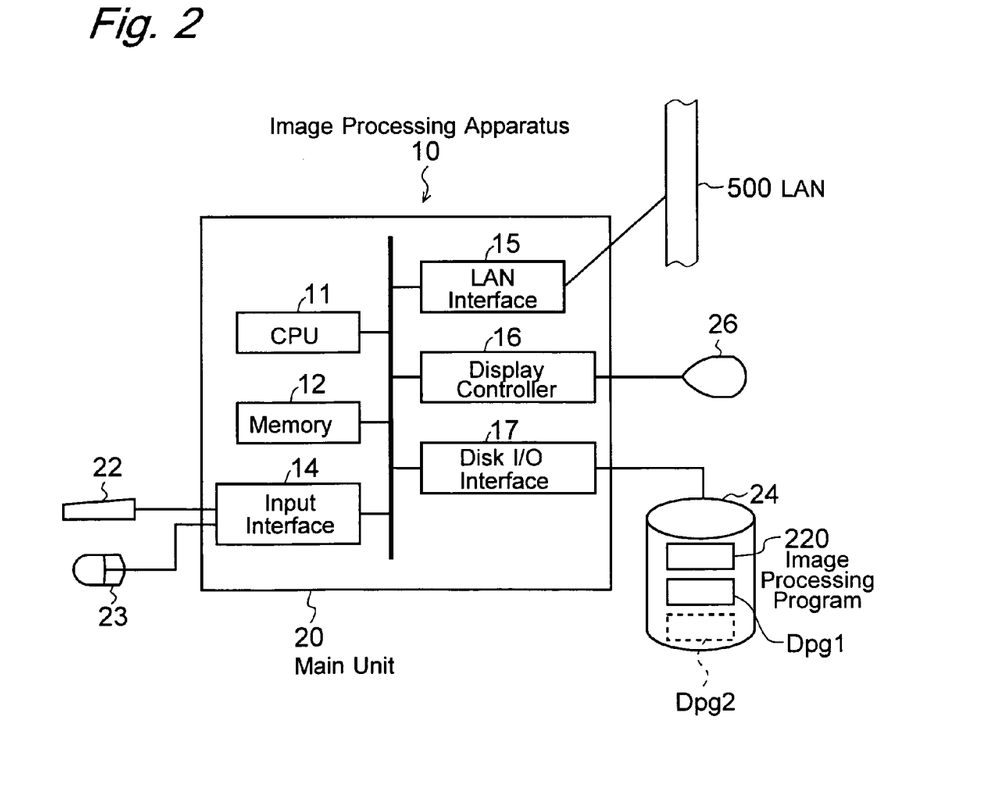
FIG. 2 is a block diagram showing the hardware configuration of the image processing apparatus according to the embodiment.

FIG. 2 is a block diagram showing the hardware configuration of the prepress image processing apparatus 10 according to the present embodiment. This image processing apparatus 10 runs an image process 122 including an adjoining vector extraction process and trapping image generating process as a RIP preprocess 120. The image processing apparatus 10 could also run RIP preprocesses 120 other than the image process 122 and the RIP process 140, or the image processing apparatus 10 could run only the adjoining vector extraction process.

As shown in FIG. 2, the image processing apparatus 10 according to this embodiment is achieved using a personal computer having such hardware components as the main unit 20, a keyboard 22, mouse 23, or other input device, an auxiliary storage device 24 such as a hard disk drive, and a display device 26 such as a liquid crystal display or CRT. The main unit 20 includes a CPU 11, memory 12 such as RAM or ROM for storing programs and operating data, an input interface 14 to which the keyboard 22 and mouse 23 are connected, a LAN interface 15 for connecting this image processing apparatus 10 to a local area network (LAN) 500, a display controller 16 to which the display device 26 is connected, and a disk input/output interface 17 to which the auxiliary storage device 24 is connected. This image processing apparatus 10 is connected over the LAN 500 to the front-end processor for running the input process 100, and the page description data Dpg1 produced by the front-end processor is sent over the LAN 500 to the image processing apparatus 10 and stored to the auxiliary storage device 24.

3. Trapping

Figure 3:
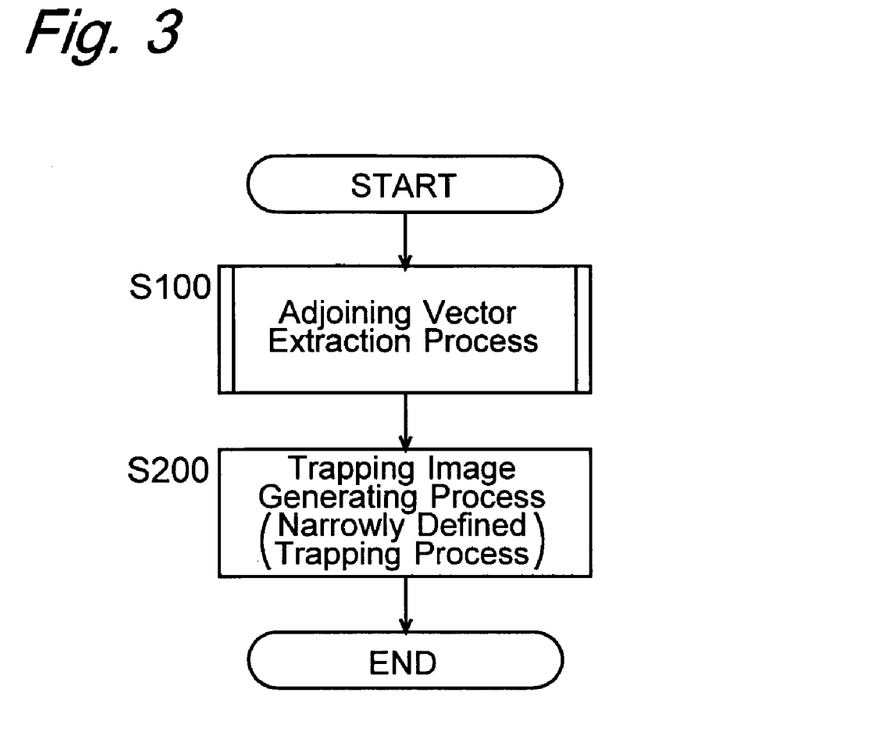
FIG. 3 is a flow chart showing the prepress image process (the image process related to trapping) in the embodiment.
Figure 4:
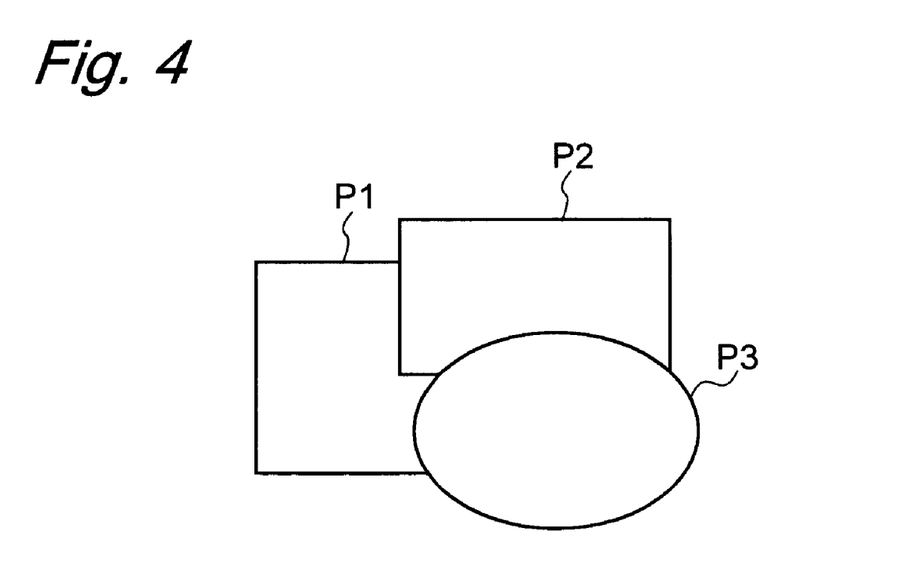
FIG. 4 describes the upper-lower relationship between objects processed by the prepress image process shown in FIG. 3.

The CPU 11 loads a specific image processing program 220 stored in the auxiliary storage device 24 into memory 12 and runs the image processing program 220 from memory to execute a trapping image process 122 as part of the prepress image process of the foregoing prepress image processing apparatus 10. FIG. 3 is a flow chart of this image process 122. This image process 122 is described in detail below. Note that the image objects that are parts of the page (the "print page") represented by the page description data Dpg1 have an upper-lower relationship based on the order in which the objects are created. Referring to the image shown in FIG. 4, for example, objects P1, P2, P3 were created in the order P1, P2, P3 such that object P1 is below object P2, and object P3 is on top of object P2.

In this embodiment of the invention the page description data Dpg1 generated by the front-end processor is stored to the auxiliary storage device 24, and the image processing program 220 is then activated by operator manipulation of an input device (such as keyboard 22 and mouse 23). This causes the CPU 11 to operate as described below.

Figure 5:
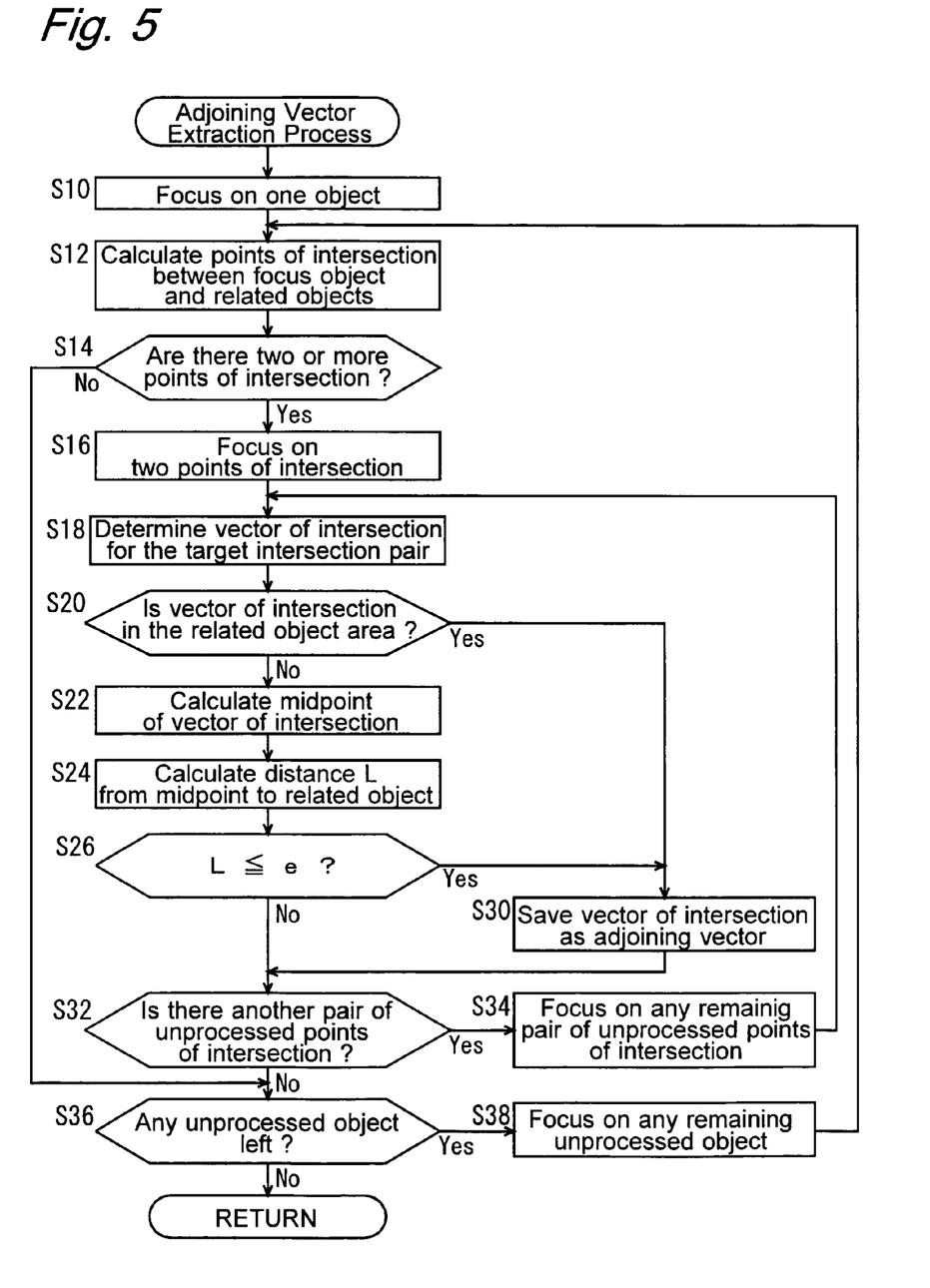
FIG. 5 is a flow chart showing the adjoining vector extraction process in the embodiment.

The CPU 11 first runs the adjoining vector extraction process (step S100) to extract the adjoining vectors identifying the areas for which a trapping image should be generated in the print page represented by the page description data Dpg1. FIG. 5 is a flow chart showing this adjoining vector extraction process. The CPU 11 operates as described below when running this adjoining vector extraction process.

The CPU 11 first focuses on any one of the objects (images that are parts of the print page) contained in the print page (step S10), and extracts the points of intersection of this focus object and other related objects (step S12).

A "related object" of the focus object is any object that adjoins the focus object and is located below the focus object.

An "adjoining object" to the focus object is any object that either overlaps or touches the focus object.

A "point of intersection" of the focus object and a related object is any point where the contour of the focus object intersects or is tangent to the contour of the related object.

After the points of intersection between the focus object and related objects are calculated, whether two or more points of intersection were found is determined (step S14). If two or more points of intersection were found, step S16 executes. If only one or no point of intersection was found, step S36 executes.

In step S16 the CPU 11 selects two of the points of intersection (below the "target intersection pair"), and obtains the vector of intersection for the target intersection pair (step S18).

Each vector of intersection is a portion of the focus object contour connecting the two points of intersection in the target intersection pair.

A "vector" is defined herein as the finite line segment, curve, or broken line following the object contour that connects two points of intersection on the contour.

Whether the vector of intersection is contained in the area of a related object to the focus object is then determined (step S20). If the vector of intersection is contained in the area of a related object to the focus object, step S30 executes, but step S22 executes if the vector of intersection is not contained in the area of a related object to the focus object. There are generally two vectors of intersection for each target intersection pair, and step S20 evaluates both vectors of intersection.

Figure 6A:
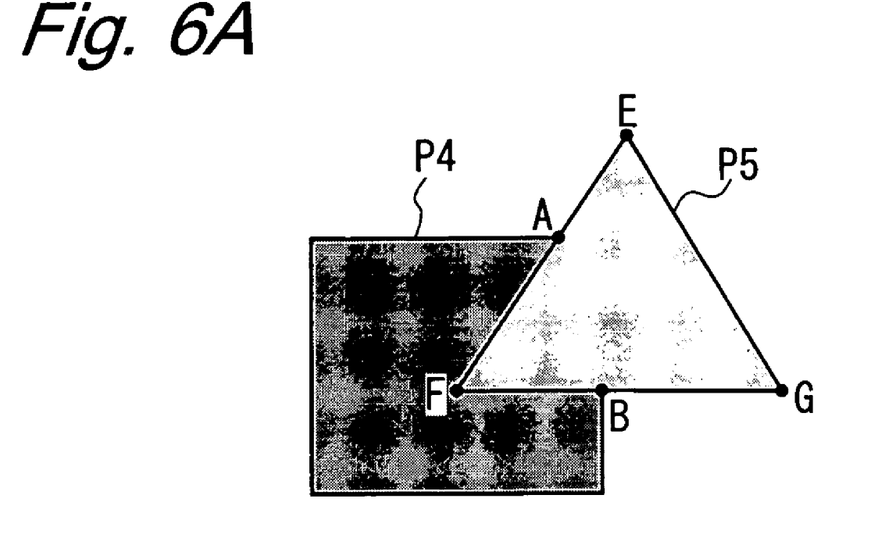
FIG. 6A is a diagram for illustrating the adjoining vector extraction process shown in FIG. 5.

Referring to FIG. 6A, for example, if object P5, which is triangle EFG, is the focus object, and square object P4 is the related object, points of intersection A and B between focus object P5 and related object P4 are target intersection pair (A,B). The vectors of intersection for target intersection pair (A,B) are first vector of intersection AFB including line segment AF and line segment FB, and second vector of intersection AEGB including line segments AE, EG, and GB. Step S20 therefore evaluates both first vector of intersection AFB and second vector of intersection AEGB as described above, and thus determines that the first vector of intersection corresponding to contour path A->F->B is within the area of related object P4, and the second vector of intersection corresponding to contour path A->E->G->B is not within the area of related object P4. Step S30 therefore operates on the first vector of intersection, and step S22 operates on the second vector of intersection.

If step S20 determines that a vector of intersection is contained in the area of a related object (referred to below as a "vector of related area intersection") to the focus object and the process therefore skips to step S30, this vector of related area intersection is saved as an adjoining vector. This adjoining vector is then used in the trapping image generating process described below and executed as step S200 in FIG. 3 to generate a trapping image along the vector of related area intersection. Of the first and second vectors of intersection in the example shown in FIG. 6A, the first vector of intersection along path A->F->B is saved as an adjoining vector.

If step S22 executes because step S20 determines that the vector of intersection is not within the area of a related object to the focus object, the midpoint of that vector of intersection (referred to below as a "vector of related area non-intersection") is calculated. Of the first and second vectors of intersection shown in FIG. 6A, the second vector of intersection corresponding to the path A->E->G->B is determined to not be within the area of related object P4, and the midpoint of this second vector of intersection, that is, the midpoint of the path A->E->G->B along the contour of the focus object P5, is determined.

The distance L between this midpoint and the related object of the focus object is then calculated (step S24). Whether this distance L is less than or equal to specified value e is then determined (step S26). This specified value e is introduced for determining whether to generate a trapping image along the vector of intersection determined to not be within the area of the related object to the focus object, that is, along the vector of related area non-intersection. A value equivalent to one or two pixels is used for the specified value e, and e=0.0127 mm for a typical resolution of 2000 dpi, for example.

If step S26 determines that distance L is less than or equal to the specified value e, the vector of related area non-intersection is saved as an adjoining vector (step S30) in order to generate a trapping image along the vector of related area non-intersection in the trapping image generating process (step S200). Step S32 then executes.

However, if step S26 determines that distance L is greater than the specified value e, step S32 executes without the vector of related area non-intersection being stored as an adjoining vector. In the example shown in FIG. 6A, the second vector of intersection (AEBG), which is a vector of related area non-intersection, is not stored as an adjoining vector based on the determination of step s26.

If the vector of related area non-intersection is a broken line as in the example shown in FIG. 6A, it is alternatively possible to determine if the distance from the midpoint of each line segment of the broken line to related object P4 is less than or equal to specified value e, and save the vector of related area non-intersection as an adjoining vector if the distance from the midpoint of any line segment to the related object P4 is less than or equal to specified value e. If this operation is applied to the example shown in FIG. 6A, the second vector of intersection (AEGB) is not saved as an adjoining vector because the distance from the midpoint of each of the three line segments AE, EG, and GB forming the second vector of intersection, i.e., forming the vector of related area non-intersection, to the related object P4 is greater than specified value e.

Step S32 then determines if there is a pair of intersections between the focus object and related objects that has not been evaluated as described above. If an unevaluated pair of intersections remains, one pair of such intersections is selected as the next target intersection pair (step S34), and the process repeats from step S18. Steps S18 to S34 thus repeat until all pairs of intersection between the focus object and related objects have been processed. When all points of intersection between the focus object and related objects have been processed, operation continues from step S36.

Whether all objects on the print page have been processed as a focus object is then determined (step S36). If one or more objects that has not been processed as a focus object remains, one of those objects is selected as the next focus object (step S38), and operation returns to step S12. Steps S12 to S38 thus repeat until all objects on the page have been processed as a focus object, and when all objects on the page have been processed as a focus object, this adjoining vector extraction process returns to the routine shown in FIG. 3. Storing the adjoining vectors as described above results in the adjoining vectors being extracted as the vectors identifying the areas where trapping images should be generated.

Figure 6B:
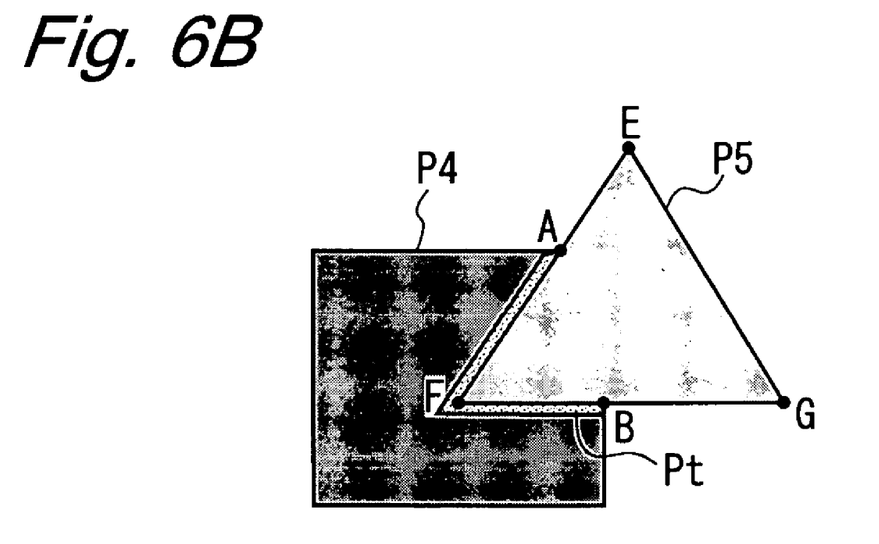
FIG. 6B is a diagram for illustrating the trapping image generating process in the embodiment.

The trapping image generating process (step S200) runs after the adjoining vector extraction process returns to the routine shown in FIG. 3. More specifically, based on the adjoining vectors extracted in the adjoining vector extraction process (step S100), images, such as strokes, of a specified width are generated along the adjoining vectors to produce the trapping images. The shape and color of each trapping image are controlled so that of the related objects and each focus object from which the adjoining vectors were extracted, the object (shape) with the lighter color is spread into the darker colored object (shape). Referring to FIG. 6A, for example, the first vector of intersection corresponding to the contour path A->F->B is extracted as an adjoining vector as described above. Assume in this example that the density (dot percent) of each color component in the upper object P5 is 100% C (cyan), 20% Y (yellow), and 0% M (magenta) and K (black), and the density of the color components in the lower object P4 is 0% C, 100% M, 50% Y, and 0% K. In this case the color of the upper object P5 is lighter than the color of the lower object P4. Therefore, as shown in FIG. 6B, a trapping image Pt is generated along the adjoining vectors in the direction resulting in the upper object P5 expanding (becoming wider) into the lower object P4. The color density of this trapping image Pt is 100% C, 100% M, 50% Y, 0% K.

After trapping images are generated for all adjoining vectors, the trapping image generating process (step S200) ends, and image processing relating to trapping ends.

4. Specific Example of the Adjoining Vector Extraction Process

The adjoining vector extraction process is described above with reference to focus object P5 and related object P4 as shown in FIG. 6A, and the vector of intersection (vector of related area intersection) contained in the area of a related object to the focus object is extracted as the adjoining vector. Extracting a vector of related area non-intersection, that is, a vector of intersection that is not contained in the area of a related object of the focus object, as an adjoining vector is described next.

In this example, as shown in FIG. 7, focus object P7 and related object P6 both have a curved contour, and these objects are tangent at points A and B, thus forming a gap region Rg between the focus object P7 and related object P6. The adjoining vectors are extracted in this case by the adjoining vector extraction process shown in FIG. 5 as described below.

The intersection pair (A,B) including points of intersection A and B is selected as the target intersection pair, and the two vectors of intersection corresponding to the two paths (finite curves) from point A to point B on the contour of focus object P7 are extracted as the vectors of intersection for target intersection pair (A,B) (step S18). Of the two paths connecting points A and B, one of the two vectors of intersection is a vector of intersection (the "opposing vector of intersection" below) following the contour of the focus object P7 along the path (the left path seen in FIG. 7) opposite the related object P6 and in contact with the gap region Rg, and the other is the vector of intersection (the "non-opposing vector of intersection" below) following the contour of the focus object P7 on the path (the right path seen in FIG. 7) that is not in contact with gap region Rg.

Because neither of the two vectors of intersection between the target intersection pair (A,B) is contained within the area of related object P6, steps S22 to S26 in the adjoining vector extraction process (FIG. 5) are applied to the two vectors of intersection described above (that is, the opposing vector of intersection and the non-opposing vector of intersection).

More specifically, when steps S22 to S26 operate on the opposing vector of intersection, the midpoint of this opposing vector of intersection, that is, the midpoint C of the path from point A to point B along the contour of the focus object P7 in contact with the gap region Rg is determined, and the distance L from this midpoint C to the related object P6 is calculated. As shown in FIG. 7, a line perpendicular to the tangent to midpoint C on the contour of the focus object P7 is drawn from midpoint C, and the length of the line segment CD from midpoint C to the intersection D of this perpendicular with the contour of the related object P6 is determined as length L. If this distance L is less than or equal to specified value e, the opposing vector of intersection is saved as an adjoining vector in step S30 in order to generate a trapping image along this opposing vector of intersection in the trapping image generating process (step S200) If this distance L is greater than specified value e, the opposing vector of intersection is not saved as an adjoining vector.

When steps S22 to S26 operate on the non-opposing vector of intersection, the midpoint of this non-opposing vector of intersection, that is, the midpoint (not shown) of the path (the path around the right side of focus object P7 in FIG. 7) from point A to point B on the contour of the focus object P7 that is not in contact with the gap region Rg, is determined, and the distance L from this midpoint to the related object P6 is calculated. Because distance L is greater than specified value e in this case, the non-opposing vector of intersection is not saved as an adjoining vector.

A vector of intersection that is not in the area of a related object but for which the foregoing distance L is less than or equal to specified value e (a distance equivalent to one or two pixels) is thus saved as an adjoining vector. Adjoining vectors resulting in a trapping image being reliably generated where required are thus extracted even when there is a slight gap between two objects with little overlap therebetween.

Figure 8:
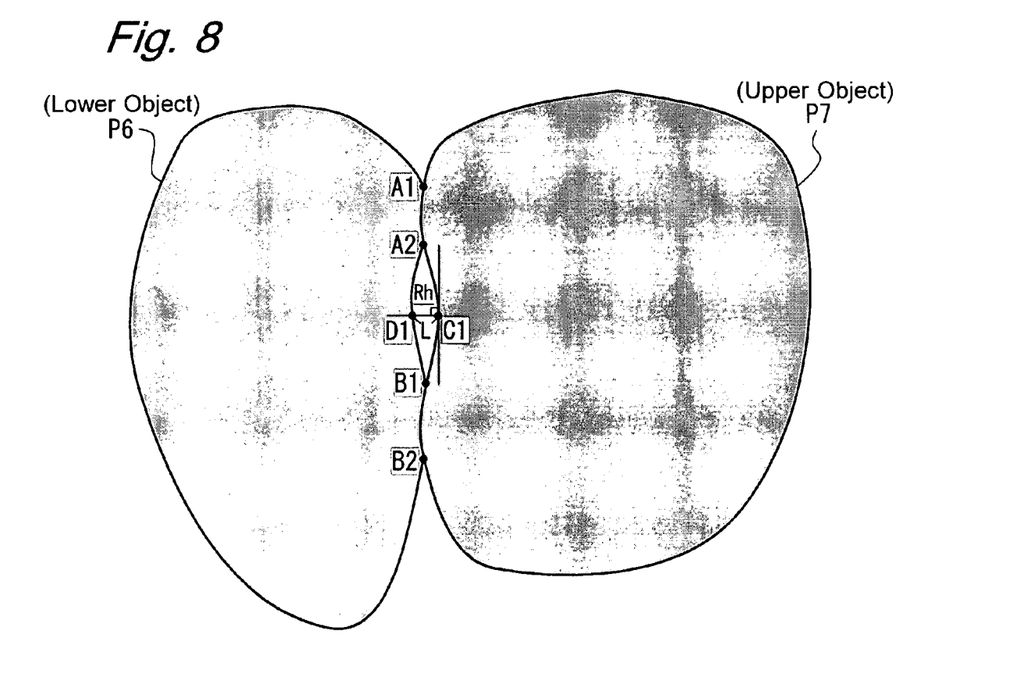
FIG. 8 is a diagram for illustrating another specific example of the adjoining vector extraction process shown in FIG. 5.

The two objects (focus object P7 and related object P6) shown in FIG. 7 are tangent at two points, but as shown in FIG. 8 the two objects could overlap in two areas resulting in four points of intersection A1, A2, B1, B2 and a gap region Rh between the two objects. Even in this case, however, the foregoing adjoining vector extraction process will extract the adjoining vectors resulting in a trapping image being generated where needed.

More specifically in this case, the vector of intersection corresponding to the path from point A1 to point A2 on the contour of focus object P7, and the vector of intersection corresponding to the path from point B1 to point B2 on the same contour, are extracted as adjoining vectors. In addition, if the distance L (the length of line segment C1D1) to the related object P6 from the midpoint C1 of the path along the contour from point A2 to point B1 in contact with the gap region Rh is also less than or equal to specified value e, this opposing vector of intersection corresponding to the path A2->B1 is also extracted as an adjoining vector.

5. Implementation as a Software Program

A prepress image process including an image trapping process 122 as described above is achieved by the CPU 11 of the image processing apparatus 10 incorporating computer hardware loading the foregoing image processing program 220 into memory 12 and running the program. Part or all of this image processing program 220 can be provided by means of a computer-readable storage medium such as CD-ROM (Compact Disc Read-Only Memory) recording the program 220. More specifically, the user purchases a CD-ROM containing the image processing program 220, loads the CD-ROM into an appropriate disc drive (not shown in the figure), and then reads and installs the image processing program 220 from the CD-ROM to the auxiliary storage device 24. The image processing program 220 could alternatively be received over a communication network such as a LAN 500 or WAN (wide area network) and installed to the auxiliary storage device 24. The manufacturer could further alternatively install all or part of the image processing program 220 to the auxiliary storage device 24 before shipping the prepress image processing apparatus 10.

6. Advantageous Effects

When there is a small gap between two objects due, for example, to little overlap therebetween, and a vector of intersection is not within the area of a related object that is the lower object of two overlapping objects, the present embodiment extracts and saves this vector of intersection as an adjoining vector if the distance from the midpoint of the vector of intersection to the related object is less than or equal to a specified value. As a result, trapping can be reliably applied where needed even when there is a small gap due, for example, to little overlap between two objects.

7. Variations

To determine whether to generate a trapping image along a vector of intersection when the vector of intersection connecting points of intersection between one object and another related object is not contained in the area of the related object, the foregoing embodiment determines if the distance L between the midpoint of the vector of intersection and the related object is less than or equal to a specified value e (step S26), and then saves that vector of intersection as an adjoining vector if distance L is less than or equal to specified value e (step S30). However, the method of determining whether to generate a trapping image along a vector of intersection that is not within the area of a related object shall not be limited to the method described in step S26, and other decision methods can be used insofar as whether to generate a trapping image is based on the degree of proximity between the vector of intersection and the related object.

For example, the area of a gap region between one object and a related object that is also in contact with a vector of intersection (see FIG. 7) could be calculated, and whether this area is less than or equal to a specified area could be determined. If this area is less than or equal to the specified area, the vector of intersection could be saved as an adjoining vector to generate a trapping image along that vector of intersection. Referring to the example shown in FIG. 7, the gap area could be determined from the number of pixels in the gap region Rg contained between the vector corresponding to path A->C->B and the vector corresponding to path A->D->B, or by integration based on the two curves ACB, ADB equivalent to these vectors.

While the invention has been described in detail, the foregoing description is in all aspects illustrative and not restrictive. It is understood that numerous other modifications and variations can be devised without departing from the scope of the invention.

This application claims priority based on Japanese patent application 2003-384831 titled "Image processing apparatus, image processing method, and image processing program for prepress printing," filed on Nov. 14, 2003, the content of which is incorporated herein by reference.

What is claimed is:

1. A prepress image processing apparatus for extracting as an adjoining vector a specific portion of a contour of one of two adjoining objects that are parts of an overall image in printed output in order to identify areas for which a trapping image must be generated at color boundaries in color printing to prevent exposing an underlying part, comprising:
   a point-of-intersection calculation means for calculating points of intersection between the contours of the two objects;
   a vector-of-intersection calculation means for calculating as a vector of intersection a portion of a contour of an upper object that is equivalent to a path along said contour joining two points of intersection calculated by the point-of-intersection calculation means, the upper object being one of the two objects and being created sequentially after the other one of the two objects;
   an adjoining vector registration means for registering the vector of intersection as an adjoining vector when the vector of intersection is contained in an area of a lower object, the lower object being the other one of the two objects and being created sequentially before the upper object; and
   an evaluation means for determining whether to generate a trapping image along the vector of intersection based on a degree of proximity between the vector of intersection and the lower object when the vector of intersection is not contained in the area of the lower object;
   wherein the adjoining vector registration means registers the vector of intersection as an adjoining vector if the evaluation means determines that a trapping image must be generated along the vector of intersection even though the vector of intersection is not contained in the area of the lower object.

2. A prepress image processing apparatus according to claim 1, wherein, when the vector of intersection is not in the area of the lower object, the evaluation means determines that a trapping image must be generated along the vector of intersection if a distance between the midpoint of the vector of intersection and the lower object is less than or equal to a predetermined value.

3. A prepress image processing apparatus according to claim 1, wherein the evaluation means includes means for acquiring a point of intersection between the contour of the lower object and a line that passes through the midpoint of the vector of intersection perpendicularly to a tangent to the upper object at said midpoint, and calculating the length of the line segment connecting said point of intersection and said midpoint as said distance, when the vector of intersection is not in the area of the lower object.

4. A prepress image processing apparatus according to claim 1, wherein, when the vector of intersection is not in the area of the lower object, the evaluation means determines that a trapping image must be generated along the vector of intersection if an area of a gap region formed between the two objects and in contact with the vector of intersection is less than or equal to a predetermined value.

5. A prepress image processing method for extracting as an adjoining vector a specific portion of a contour of one of two adjoining objects that are parts of an overall image in printed output in order to identify areas for which a trapping image must be generated at color boundaries in color printing to prevent exposing an underlying part, comprising:
   a point-of-intersection calculation step of calculating points of intersection between the contours of the two objects;
   a vector-of-intersection calculation step of calculating as a vector of intersection a portion of a contour of an upper object that is equivalent to a path along said contour joining two points of intersection calculated in the point-of-intersection calculation step, the upper object being one of the two objects and being created sequentially after the other one of the two objects;
   an adjoining vector registration step of registering the vector of intersection as an adjoining vector when the vector of intersection is contained in an area of a lower object, the lower object being the other one of the two objects and being created sequentially before the upper object; and
   an evaluation step of determining whether to generate a trapping image along the vector of intersection based on a degree of proximity between the vector of intersection and the lower object when the vector of intersection is not contained in the area of the lower object;
   wherein the vector of intersection is registered as an adjoining vector in the adjoining vector registration step if it is determined in the evaluation step that a trapping image must be generated along the vector of intersection even though the vector of intersection is not contained in the area of the lower object.

6. A prepress image processing method according to claim 5, wherein, when the vector of intersection is not in the area of the lower object, it is determined in the evaluation step that a trapping image must be generated along the vector of intersection if a distance between the midpoint of the vector of intersection and the lower object is less than or equal to a predetermined value.

7. A prepress image processing method according to claim 6, wherein the evaluation step includes the step of acquiring a point of intersection between the contour of the lower object and a line that passes through the midpoint of the vector of intersection perpendicularly to a tangent to the upper object at said midpoint, and calculating the length of the line segment connecting said point of intersection and said midpoint as said distance, when the vector of intersection is not in the area of the lower object.

8. A prepress image processing method according to claim 5, wherein, when the vector of intersection is not in the area of the lower object, it is determined in the evaluation step that a trapping image must be generated along the vector of intersection if an area of a gap region formed between the two objects and in contact with the vector of intersection is less than or equal to a predetermined value.

9. A computer-readable storage medium for storing a computer program for extracting as an adjoining vector a specific portion of a contour of one of two adjoining objects that are parts of an overall image in printed output in order to identify areas for which a trapping image must be generated at color boundaries in color printing to prevent exposing an underlying part, said program causing a computer to execute:

a point-of-intersection calculation step of calculating points of intersection between the contours of the two objects;

a vector-of-intersection calculation step of calculating as a vector of intersection a portion of a contour of an upper object that is equivalent to a path along said contour joining two points of intersection calculated in the point-of-intersection calculation step, the upper object being one of the two objects and being created sequentially after the other one of the two objects;

an adjoining vector registration step of registering the vector of intersection as an adjoining vector when the vector of intersection is contained in an area of a lower object, the lower object being the other one of the two objects and being created sequentially before the upper object; and an evaluation step of determining whether to generate a trapping image along the vector of intersection based on a degree of proximity between the vector of intersection and the lower object when the vector of intersection is not contained in the area of the lower object;

wherein the vector of intersection is registered as an adjoining vector in the adjoining vector registration step if it is determined in the evaluation step that a trapping image must be generated along the vector of intersection even though the vector of intersection is not contained in the area of the lower object.

10. A computer-readable storage medium for storing a computer program according to claim 9, wherein, when the vector of intersection is not in the area of the lower object, it is determined in the evaluation step that a trapping image must be generated along the vector of intersection if a distance between the midpoint of the vector of intersection and the lower object is less than or equal to a predetermined value.

11. A computer-readable storage medium for storing a computer program according to claim 10, wherein the evaluation step includes the step of acquiring a point of intersection between the contour of the lower object and a line that passes through the midpoint of the vector of intersection perpendicularly to a tangent to the upper object at said midpoint, and calculating the length of the line segment connecting said point of intersection and said midpoint as said distance, when the vector of intersection is not in the area of the lower object.

12. A computer-readable storage medium for storing a computer program according to claim 9, wherein, when the vector of intersection is not in the area of the lower object, it is determined in the evaluation step that a trapping image must be generated along the vector of intersection if an area of a gap region formed between the two objects and in contact with the vector of intersection is less than or equal to a predetermined value.

* * * * *